United States Patent [19]

Ito

[11] Patent Number: 4,476,970

[45] Date of Patent: Oct. 16, 1984

[54] SPEED CHANGE CONTROL APPARATUS AND METHOD FOR AUTOMATIC TRANSMISSION

[75] Inventor: Hiroshi Ito, Toyota, Japan

[73] Assignee: Toyota Jidosha Kogyo Kabushiki Kaisha, Toyota, Japan

[21] Appl. No.: 312,928

[22] Filed: Oct. 19, 1981

[30] Foreign Application Priority Data

Oct. 31, 1980 [JP] Japan ................. 55-152181

[51] Int. Cl.³ ............................................. B60K 41/28
[52] U.S. Cl. ............................. 192/0.052; 192/0.092; 192/3.29; 192/3.58
[58] Field of Search .................. 192/3.3, 3.57, 3.58, 192/0.033, 3.31, 0.052, 0.076, 0.092, 3.29, 3.28; 74/866, 731, 752 A; 364/424.1

[56]     References Cited
U.S. PATENT DOCUMENTS 3,448,640  6/1969  Nelson ................................ 74/866
4,041,809  8/1977  Dick et al. .......................... 74/866
4,270,636  6/1981  Sunohara et al. ................. 192/3.31
4,377,226  3/1983  Chevalier et al. ................ 192/3.31
4,386,687  6/1983  Chevalier et al. ................ 192/3.31

Primary Examiner—George H. Krizmanich
Assistant Examiner—M. Manley
Attorney, Agent, or Firm—Finnegan, Henderson, Farabow, Garrett & Dunner

[57]                     ABSTRACT

A direct coupled clutch is provided in parallel to a fluid type torque converter in an automatic transmission, and supply of oil pressure to a hydraulic servo of the direct coupled clutch is controlled by an electromagnetic valve. Alteration of engaging condition of engaging elements in a transmission gear is carried out by maintaining the direct coupled clutch in the disengaging condition. As a result, difference of torque between the engine side of the engaging elements and the drive wheel side, which difference is produced in the speed change, is absorbed by the fluid type torque converter so that impact is restrained.

7 Claims, 10 Drawing Figures

SPEED CHANGE CONTROL APPARATUS AND METHOD FOR AUTOMATIC TRANSMISSION

BACKGROUND OF THE INVENTION

1. Field of the Invention

This invention relates to a speed change control method of an automatic transmission in which a direct coupled clutch is provided in parallel to a fluid type torque converter and supply of oil pressure to a hydraulic servo for respective friction engaging elements including this direct coupled clutch is controlled by an electromagnetic valve.

2. Description of the Prior Art

In the prior automatic transmission, when the vehicle speed exceeds a predetermined value, the direct coupled clutch is held in the engaging condition to prevent loss in the fluid type torque converter. However, when the vehicle speed is changed while the direct coupled clutch is in the engaging condition, variation of acceleration and vibration of a car body in the speed change are increased to damage a smooth ride in the vehicle.

SUMMARY OF THE INVENTION

An object of this invention is to provide a speed change control method for an automatic transmission which can prevent effectively variation of acceleration and vibration of the vehicle body during speed change caused when a direct coupled clutch is maintained in the engaging condition.

According to this invention to achieve this object, the speed change is carried out with the direct coupled clutch being maintained in the disengaging condition. The supply of oil pressure is controlled by an electromagnetic valve to control the engagement and disengagement of the direct coupled clutch.

Thus, since the difference between output torque of an engine and torque of a drive gear is properly absorbed by the fluid type torque converter, the car body during the speed change is protected from the variation of acceleration and vibration.

According to this invention, since the engagement and disengagement of the direct coupled clutch is controlled by the electromagnetic valve for controlling the supply of oil pressure to the hydraulic servo, the direct coupled clutch is prevented from the inaccurate engaging and disengaging operation due to flow resistance and the oil viscosity in oil path. This is preferred over a method in which the engagement and disengagement of the direct coupled clutch are controlled by the use of a spool valve controlled by control oil pressure.

In a preferred embodiment of this invention, first and second timers are operated in the speed change operation and the operating time of the second timer is longer than that of the first timer, the direct coupled clutch being maintained in the disengaged condition during the operation of the second timer. The alteration of the engaging condition of the friction engaging elements in the transmission gear is carried out between the completion of the operation of the first timer and that of the second timer.

The operating time of the first and second timers is preferably set corresponding to the speed change stage before and after the speed change or the type of the transmission.

The speed change operation can be detected by the range signal of the shift lever.

After the completion of operation of the second timer, it is determined whether or not the engine is run within ON range of lock-up, and the direct coupled clutch is preferably maintained in the engaged condition only when the engine is run within the ON range of lock-up.

DETAILED DESCRIPTION OF THE PREFERRED EMBODIMENTS

Now, there will be described an embodiment of this invention with reference to the drawings.

Figure 1:
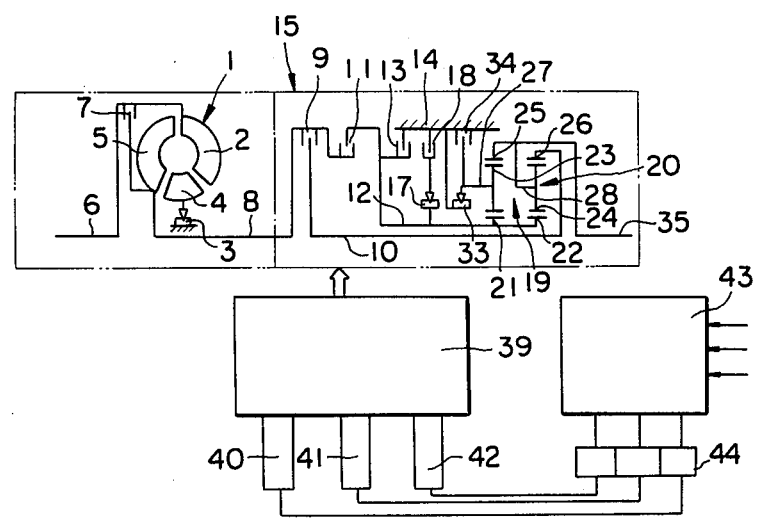
FIG. 1 is a schematic drawing of the whole automatic transmission according to this invention.

FIG. 1 is a schematic drawing showing the whole automatic transmission according to this invention.

A fluid type torque converter 1 comprises a stator 4 fixed to a housing through a pump impeller 2 and an one-way clutch 3 and a turbine runner 5, and the pump impeller 2 is coupled to a crankshaft 6 of an engine. A direct coupled clutch 7 is provided in parallel to the fluid type torque converter 1 to control the connection of the crankshaft 6 to the turbine runner 5. A turbine shaft 8 is coupled to the turbine runner 5 and connected to a center shaft 10 through a front clutch 9 of a transmission gear 15 while being connected to an intermediate shaft 12 through a rear clutch 11. The intermediate shaft 12 can be fixed to a housing 14 through a first brake 13 and also through an one-way clutch 17 and a second brake 18.

Two planetary gears 19,20 have respectively sun gears 21,22, pinions 23,24, ring gears 25,26 and carriers 27,28. The sun gears 21,22 are provided integrally with the intermediate shaft 12, the carrier 27 can be fixed to the housing 14 through an one-way clutch 33 and also through a third brake 34. The ring gear 25 is coupled to the carrier 28, to the center shaft 10 and to an output shaft 35. The following table shows operation to provide each change stage. The figures correspond to engaging elements respectively, ○ shows the engaging condition and △ shows operations only in an engine brake.

|  | 9 | 11 | 13 | 18 | 34 | 17 | 33 |
|---|---|---|---|---|---|---|---|
| 1st speed | ○ |  |  |  | △ |  | ○ |
| 2nd speed | ○ |  | △ |  |  | ○ |  |
| 3rd speed | ○ | ○ |  |  |  |  |  |
| Reverse |  | ○ |  |  | ○ |  |  |

The operation of each engaging element except for the one-way clutches 17,33 is controlled by the supply of oil pressure to the hydraulic servo provided corresponding to the engaging element, and this supply of oil pressure is controlled by a 1-2 solenoid valve 40 and 2-3 solenoid valve 41 provided in a hydraulic control 39. Another solenoid valve 42 controls the supply of oil pressure to a hydraulic servo for the direct coupled clutch 7.

A computer 43 operated according to a predetermined program determines the operation of the solenoid valves 40,41,42 on the basis of signals of vehicle speed, opening of a throttle valve in the carburetor, range position of a shift lever, etc., and sends the outputs to the respective solenoid valves 40,41,42 through an amplifying section 44.

Figure 2:
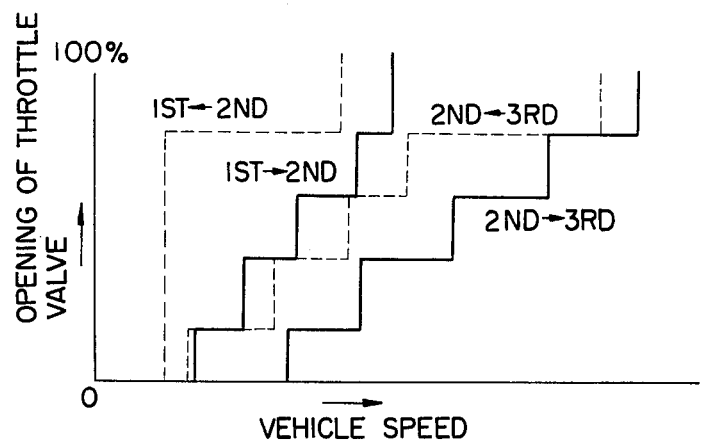
FIG. 2 is a speed change diagram of the automatic transmission shown in FIG. 1.
Figure 3:
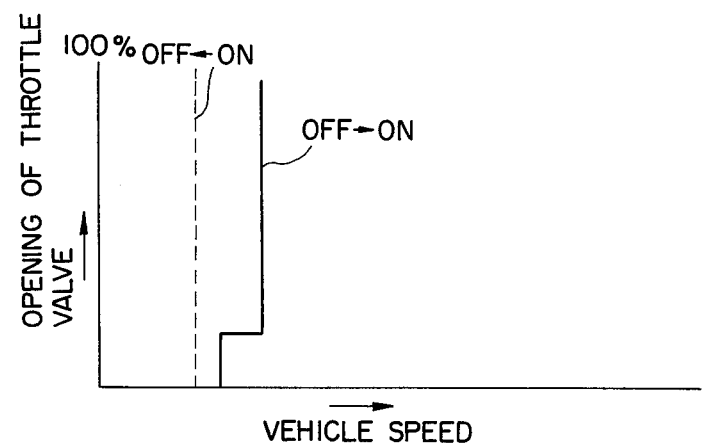
FIG. 3 is an operation diagram of a direct coupled clutch shown in FIG. 1.

FIG. 2 is a speed change diagram in which the solid line shows the speed change in up shift and the broken line the speed change in down shift. FIG. 3 is an operation diagram of the direct coupled clutch 7 in which the direct coupled clutch 7 at the high vehicle speed side is shown maintained at the engaging condition, the solid line showing the operation from OFF(disengagement) to ON(engagement) and the broken line from ON to OFF.

Figure 4:
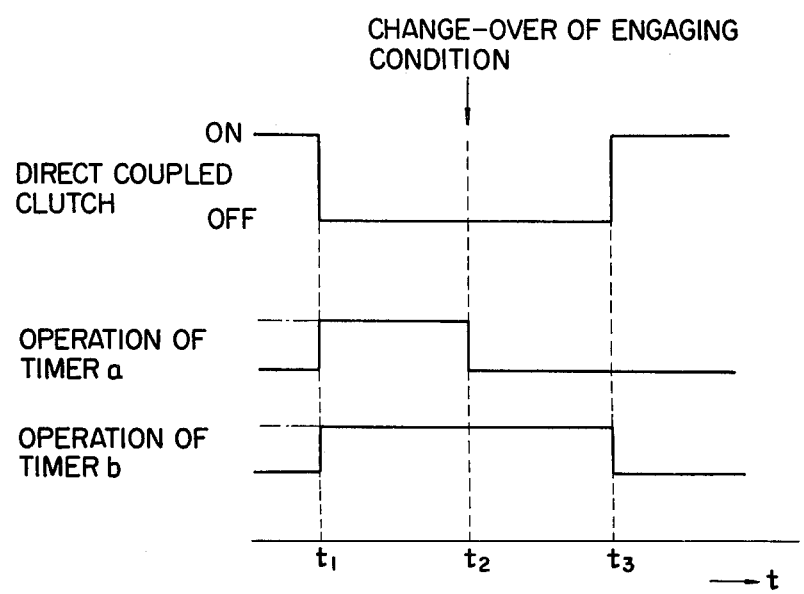
FIG. 4 is an explanatory diagram of the principle of this invention.

FIG. 4 shows schematically the basic concept of this invention. When the vehicle speed exceeds a predetermined value, the direct coupled clutch 7 is maintained in the engaging condition. However, in this period, when a speed change signal is produced in time $t_1$ for example, the direct coupled clutch 7 is immediately operated from ON to OFF while timers a and b begin to operate. The operating time of the timer a is set shorter than that of the timer b.

In time $t_2$ when the operation of the timer a is completed, the solenoid valve 40 or 41 is operated to change over the engaging condition of the engaging elements and then in time $t_3$ when the operation of the timer b is completed, the solenoid valve 42 is operated to place the direct coupled clutch 7 again in the engaging condition from time $t_3$ on.

Figure 5:
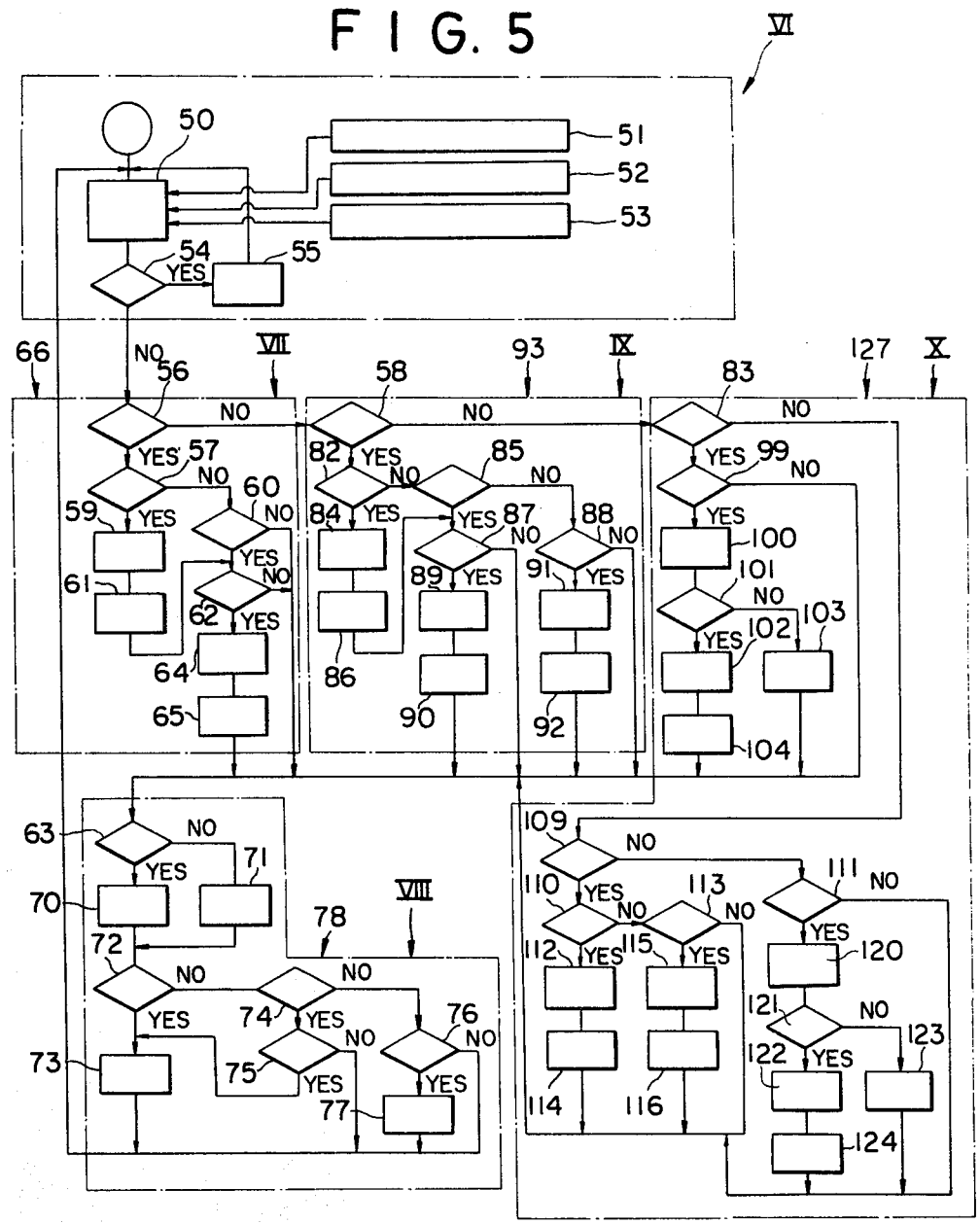
FIG. 5 is a flow chart of an embodiment of this invention.
Figure 6:
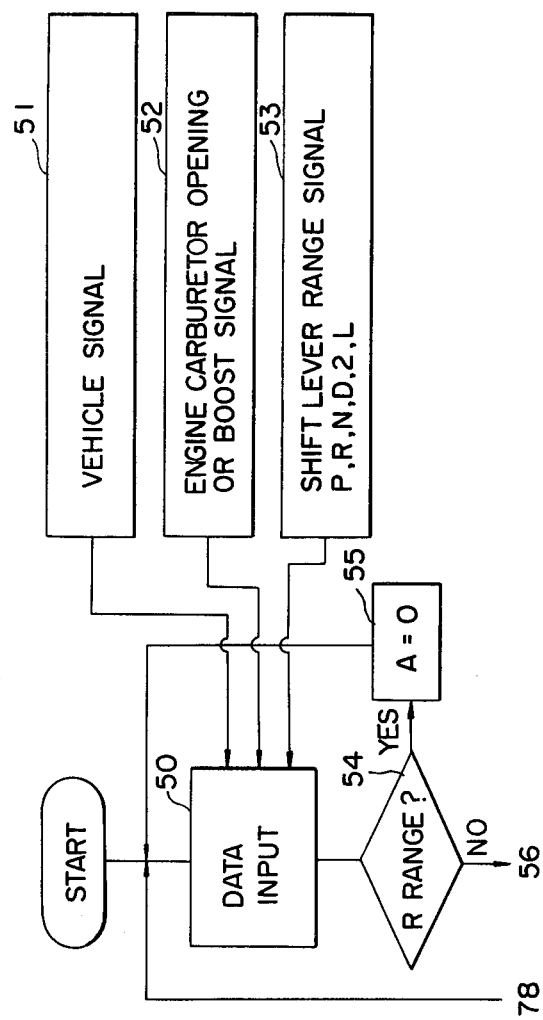
FIG. 6 is a detailed view of VI shown in FIG. 5.
Figure 7:
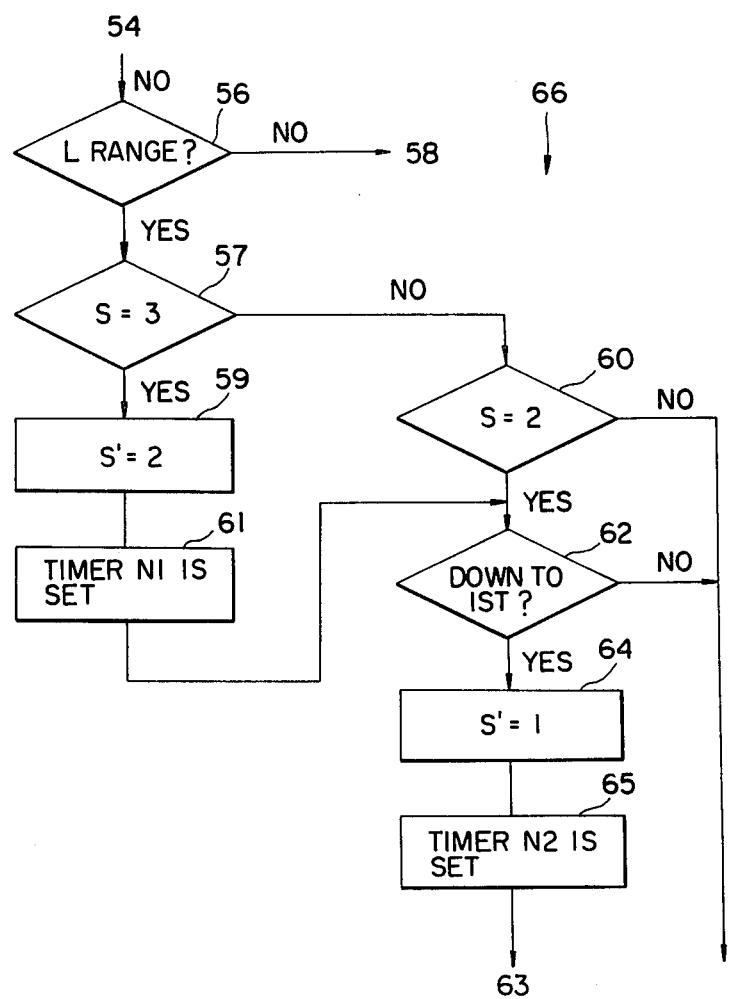
FIG. 7 is a detailed view of VII shown in FIG. 5.
Figure 8:
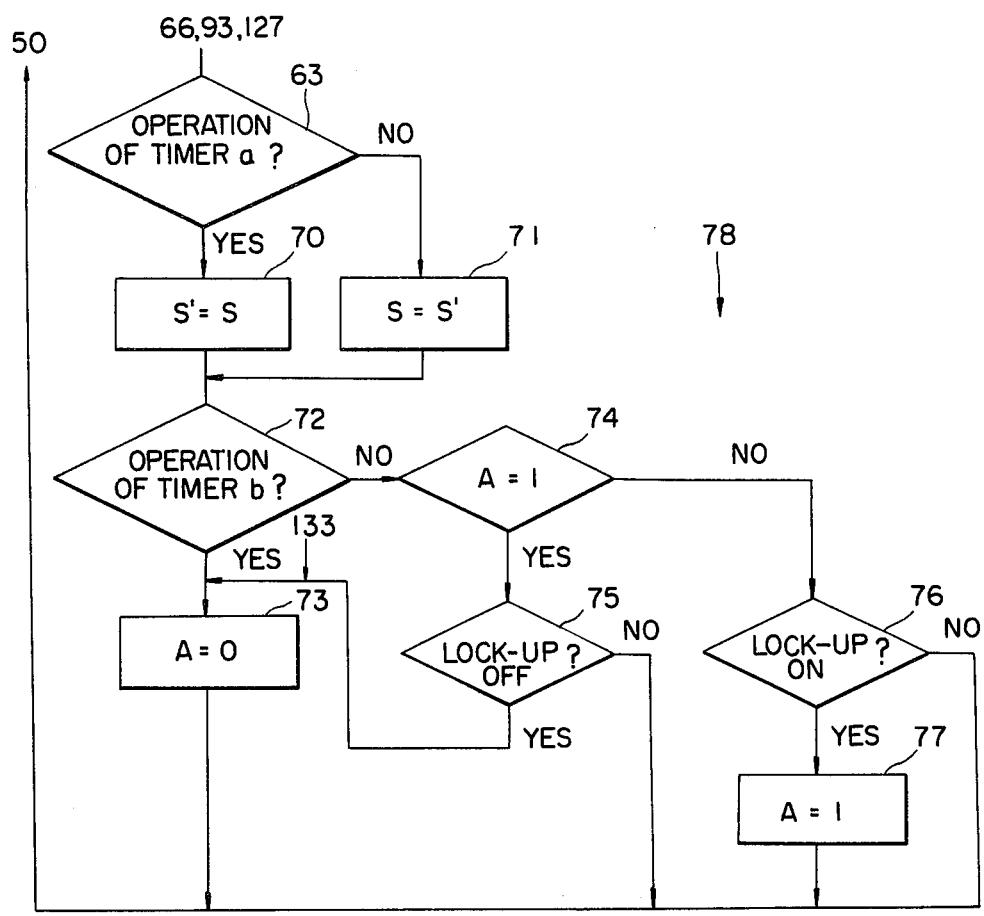
FIG. 8 is a detailed view of VIII shown in FIG. 5.
Figure 9:
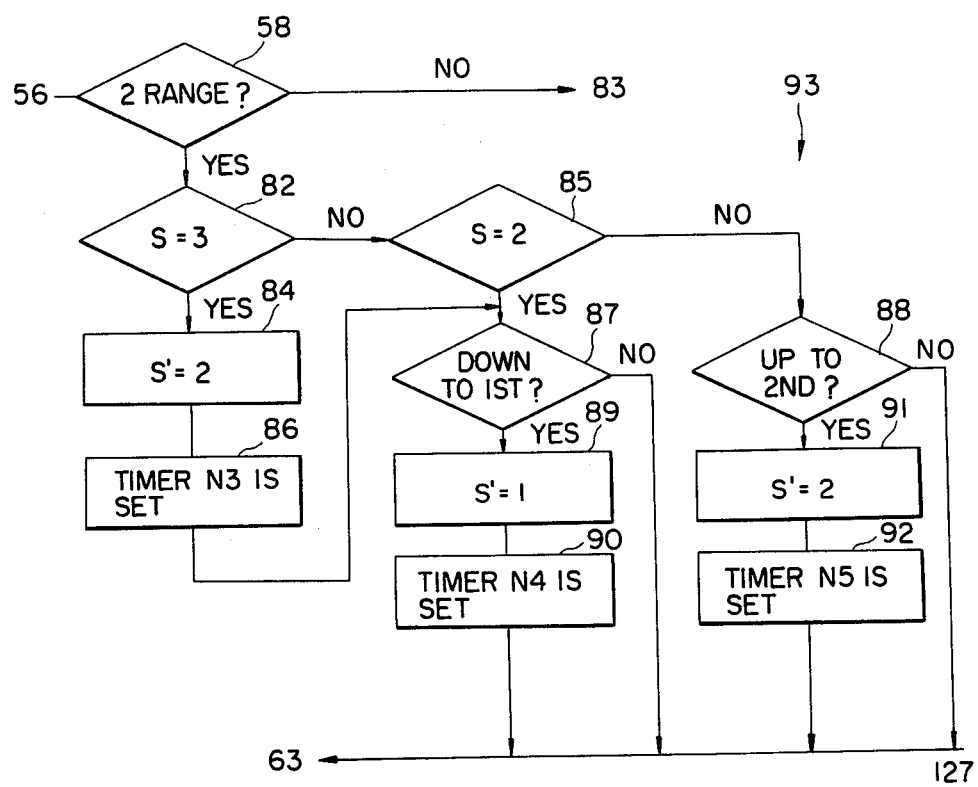
FIG. 9 is a detailed view of IX shown in FIG. 5.
Figure 10:
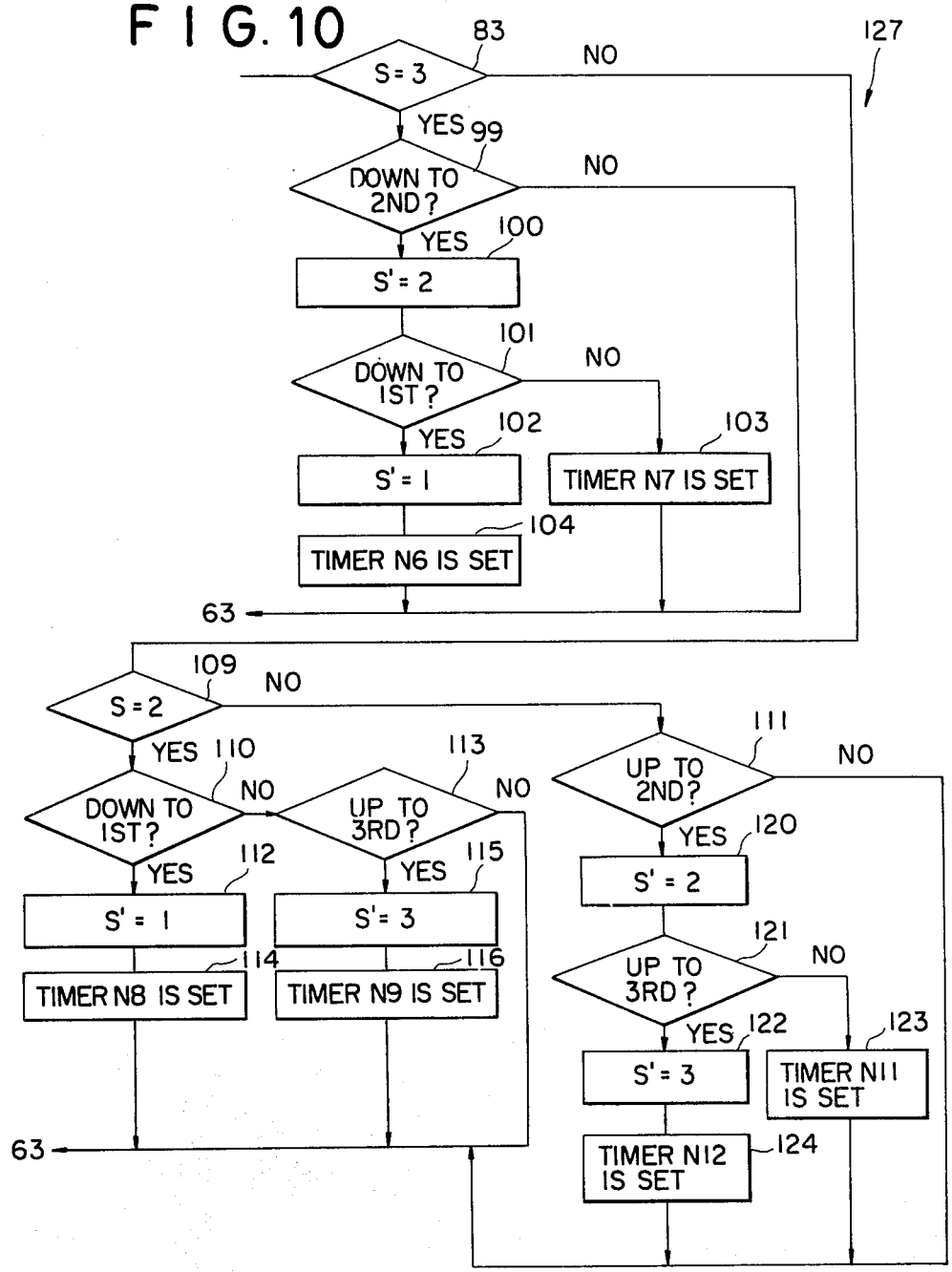
FIG. 10 is a detailed view of X shown in FIG. 5.

FIG. 5 is a flow chart of an embodiment of this invention.

In step 50, the following values are are read respectively from input points 51,52,53: vehicle speed signal, carburetor throttle valve opening or boost (intake pipe negative pressure) signal, and range signal of the shift lever, e.g., P(parking), R(reverse), N(neutral), D(drive), 2(second) and L(low). In step 54, it is judged whether or not the shift lever is in the R range and the program proceeds to step 55 if it is judged "yes" and to step 56 if "no."

In step 55 A=0 is given (hereinafter the condition of the direct coupled clutch 7 is defined as A and the engaging and disengaging conditions of the direct coupled clutch 7 are defined respectively as A=1 and A=0) and the program returns to step 50. In step 56 it is judged whether or not the shift lever is in the L range and the program proceeds to step 57 if it is judged "yes" and to step 58 if "no."

In step 57 it is judged whether or not S is equal to 3 (hereinafter the condition of the transmission gear 15 at that time is defined as S and same conditions in the first, second and third speed stages are respectively defined as S=1, S=2 and S=3) and the program proceeds to step 59 if it is judged "yes" and to step 60 if "no."

In step 59, S' is set equal to 2 (hereinafter next set condition of the transmission gear 15 is defined as S' and the next set conditions in the first, second and third speed stages are respectively defined as S'=1, S'=2 and S'=3).

In step 61, a timer N1 is set to start its operation and the program proceeds to step 62. Hereinafter timers N1,N2 ... N11 are defined and assumed to have respectively two types of counters of the timer a and timer b. Also, the operating time of the timer b is set longer than that of the timer a.

In step 60 it is judged whether or not S is equal to 2 and the program proceeds to step 62 if it is judged "yes" and to step 63 if "no." In step 62 it is judged whether or not the shift lever is shifted down to the first speed and the program proceeds to step 64 if it is judged "yes" and to step 63 if "no." In step 64, S'=1 is set and the time N2 is set in step 65 to start its operation.

When the shift lever is shifted to L range, a series of routines 66 comprising steps 56,57,59,60,61,62,64 and 65 carry out processes shown on the following table, corresponding to the cases of S=3,2 and 1;

| | L range | | | | |
|---|---|---|---|---|---|
| | S = 3 | | S = 2 | | |
| Case | Down to 2nd speed | Down to 1st speed | Maintenance of present condition | Down to 1st speed | S = 1 |
| Sequence of step | 56 57 59 61 62 | 56 57 59 61 62 64 65 | 56 57 60 | 56 57 60 62 64 | 56 57 60 |
| Timer to be set | N1 | N2 | None | N2 | None |
| S' = | 2 | 1 | Unvaried | 1 | Unvaried |

In step 63 it is judged whether or not the timer a is still being operated and the program proceeds to step 70 if it is judged "yes" and to step 71 if "no." In step 70, S'=S is set and the program proceeds to step 72. In step 71, S=S' is set and the program proceeds to step 72. In step 72 it is judged whether or not the timer b is still being operated and the program process to step 72 if it is judged "yes" and to step 74 if "no."

In step 73A is set equal to 0 and then the program returns to step 50. In step 74 it is judged whether or not A is equal to 1 and the program proceeds to step 75 if it is judged "yes" and to step 76 if "no."

In step 75 it is judged whether the engine at that time is in the range to disengage the direct coupled clutch 7 (lock-up off) on the basis of the operation diagram shown in FIG. 3 or not (lock-up on) and the program proceeds to step 73 if it is judged "yes" and returns to step 50 if "no."

In step 76 it is judged whether or not it is lock-up-on and the program proceeds to step 77 to set A=1 if it is judged "yes" and then returns to step 50 immediately if "no."

A routine 78 comprising a series of steps 63,70,71,72,73,74,75,76 and 77 performs processes shown on the following table, corresponding to the operations of the timers a and b.

| | | After completion of operation of timer a | | |
|---|---|---|---|---|
| | During operation of time a | During operation of timer b | After completion of operation of timer b | |
| Case | | | Lock-up ON | Lock-up OFF |
| Sequence of step | 63 70 72 | 63 71 72 | 63 71 72 | 63 71 72 |

-continued

| | After completion of operation of timer a | | | |
|---|---|---|---|---|
| | During | During | After completion of | |
| | operation | operation | operation of timer b | |
| Case | of time a | of timer b | Lock-up ON | Lock-up OFF |
| | 73 | 73 | 74 | 74 |
| | | | 75,76 | 75,76 |
| | | | 77 | 73 |
| A = | 0 | 0 | 1 | 0 |
| S = | Unvaried | S' | S' | S' |

In step 58 it is judged whether or not the range is 2 range and the program proceeds to step 82 if it is judged yes and to step 83 if no. In step 82 it is judged whether or not S is equal to 3 and the program proceeds to step 84 if it is judged "yes" and to step 85 if "no." In step 84, S'=2 is set and in step 86, the timer N3 is set to start its operation and the program proceeds to step 87.

In step 85 it is judged whether or not S is equal to 2 and the program proceeds to step 87 if it is judged "yes" and to step 88 if it is judged "no." In step 87 is judged whether or not the shift lever should be shifted down to the first speed and the program proceeds to step 89 if it is judged "yes" and to routine 78 if "no." In step 89, S'=1 is set and in step 90, the timer N4 is set to start its operation.

In step 88 it is judged whether or not the shift lever is shifted up to the second speed and the program proceeds to step 91 if it is judged "yes" and to routine 78 if "no." In step 91, S'=2 is set and in step 92, the timer N5 is set to start its operation. A series of routines 93 comprising steps 58,82,84,85,86,87,88,89,90,91 and 92 carry out processes shown on the following table:

| | 2nd range | | | | | |
|---|---|---|---|---|---|---|
| | S = 3 | | S = 2 | | S = 1 | |
| | Down | Down | Down | Mainte- nance of | Mainte- nance of | Up |
| | to 1st | to 2nd | to 1st | present | present | to 2nd |
| Case | speed | speed | speed | condition | condition | speed |
| Sequence | 58 | 58 | 58 | 58 | 58 | 58 |
| of step | 82 | 82 | 82 | 82 | 82 | 82 |
| | 84 | 84 | 85 | 85 | 85 | 85 |
| | 86 | 86 | 87 | 87 | 88 | 88 |
| | 87 | 87 | 89 | | | 91 |
| | 89 | | 90 | | | 92 |
| | 90 | | | | | |

-continued

| | 2nd range | | | | | |
|---|---|---|---|---|---|---|
| | S = 3 | | S = 2 | | S = 1 | |
| | Down | Down | Down | Mainte- nance of | Mainte- nance of | Up |
| | to 1st | to 2nd | to 1st | present | present | to 2nd |
| Case | speed | speed | speed | condition | condition | speed |
| Timer to be set | N4 | N3 | N4 | None | None | N5 |
| S' | 1 | 2 | 1 | Unvaried | Unvaried | 2 |

In step 83 it is judged whether or not S is equal to 3 and the program proceeds to step 99 if it is judged "yes" and to step 109 if "no." In step 99 it is judged whether or not the shift lever is shifted down to the second speed and the program proceeds to step 100 if it is judged "yes" and to routine 78 if "no."

In step 100, S'=2 is set. In step 101 it is judged whether or not the shift lever is shifted down to the first speed and the program proceeds to step 102 if it is judged "yes" and to step 103 if "no." In step 102', S'=1 is set and in step 104, the timer N6 is set to start its operation. In step 103, the timer N7 is set to start its operation.

In step 109 it is judged whether or not S is equal to 2 and the program proceeds to step 110 if it is judged "yes" and to step 111 if "no."

In step 110 it is judged whether or not the shift lever is shifted down to the first speed and the program proceeds to step 112 if it is judged "yes" and to step 113 if "no." In step 112, S'=1 is set and in step 114, the timer N8 is set to start its operation.

In step 113 it is judged whether or not the shift lever is shifted up to the third speed and the program proceeds to step 115 if it is judged "yes" and to routine 78 if "no." In step 115, S'=3 is set and in step 116, the timer N9 is set to start its operation.

In step 111 it is judged whether or not the shift lever is shifted up to the second speed and the program proceeds to step 120 if it is judged "yes" and to routine 78 if "no." In step 120, S'=2 is set.

In step 121 it is judged whether or not the shift lever is shifted up to the third speed and the program proceeds to step 122 if it is judged "yes" and to step 123 if "no." In step 122, S'=3 is set and in step 124, the timer $N_{10}$ is set to start its operation. In step 123 the timer $N_{11}$ is set to start its operation. By a series of routines 127 comprising steps 83,99,100,101,102,103,104,109,110,111,112,113,114,115,-116,120,121,122,123 and 124 are carried out processes shown on the following table;

| | D range | | | | | | | | |
|---|---|---|---|---|---|---|---|---|---|
| | S = 3 | | | S = 2 | | | S = 1 | | |
| | Down | Down | Present | Down | Present | Up to | Present | Up to | Up to |
| | to 1st | to 2nd | condition | to 1st | condition | 3rd | condition | 2nd | 3rd |
| Case | speed | speed | held | speed | held | speed | held | speed | speed |
| Sequence | 83 | 83 | 83 | 83 | 83 | 83 | 83 | 83 | 83 |
| of | 99 | 99 | 99 | 109 | 109 | 109 | 109 | 109 | 109 |
| step | 100 | 100 | | 110 | 110 | 110 | 111 | 111 | 111 |
| | 101 | 101 | | 112 | 113 | 113 | | 120 | 120 |
| | 102 | 103 | | 114 | | 115 | | 121 | 121 |
| | 104 | | | | | 116 | | 123 | 122 |
| | | | | | | | | | 124 |
| Timer to be set | N6 | N7 | None | N8 | None | N9 | None | N11 | N10 |

-continued

| | D range | | | | | | | | |
|---|---|---|---|---|---|---|---|---|---|
| | S = 3 | | | S = 2 | | | S = 1 | | |
| Case | Down to 1st speed | Down to 2nd speed | Present condition held | Down to 1st speed | Present condition held | Up to 3rd speed | Present condition held | Up to 2nd speed | Up to 3rd speed |
| S' = | 1 | 2 | Unvaried | 1 | Unvaried | 3 | Unvaried | 2 | 3 |

The timers set in the speed change within D range are shown on the following table;

| | Before speed change | | |
|---|---|---|---|
| After speed change | 1st speed | 2nd speed | 3rd speed |
| 1st speed | | N11 | N10 |
| 2nd speed | N8 | | N9 |
| 3rd speed | N6 | N7 | |

The set times of timers a and b in timers N6–N11 are selected properly and independently of each other in relation to the type of automatic transmission.

Thus, according to this invention, when the engagement and disengagement of the friction engaging elements are changed over on the basis of the timers a and b A=0, i.e. the direct coupled clutch provided in parallel to the fluid type torque converter is maintained in the disengaged condition so that the difference of torque between the output of engine and the drive gear in the speed change is properly absorbed by the fluid type torque converter and thus the car body is prevented effectively from variation of acceleration and vibration in the speed change.

What is claimed is:

1. An automatic transmission speed change control for a vehicle comprising:
   (a) a fluid type converter;
   (b) a transmission gear connected in series with said converter and comprising a plurality of friction engaging elements operated during a speed change;
   (c) a direct coupled clutch connected in parallel with said converter;
   (d) a solenoid valve for controlling the supply of oil pressure to said direct coupled clutch to place said clutch in an engaging position or in a disengaging condition; and
   (e) control means connected to said solenoid valve for determining the speed of said vehicle, the throttle valve opening of a carburetor of said vehicle, and the shift position of said automatic transmission, and for controlling said solenoid valve so that said direct coupled clutch is maintained in an engaging condition until a speed change of said vehicle, at which time said direct coupled clutch is changed to a disengaging position until the end of said speed change when said direct coupled clutch is returned to an engaging position;
   said control means comprising a plurality of timers each comprising first and second time counters, each of said timers corresponding to a different speed change, said first time counters establishing a time interval between disengagement of said direct coupled clutch and operation of said friction engaging elements, and said second time counters establishing a second time interval longer than said first time interval between disengagement of said direct coupled clutch and return of said direct-coupled clutch to an engaging position.

2. The speed change control in claim 1 wherein said control means includes a digital computer.

3. A method of speed change control for an automatic transmission of a vehicle comprising the steps of:
   (a) energizing a direct coupled clutch in parallel with a fluid type torque converter to drive a transmission gear connected in series with said converter;
   (b) monitoring the speed of said vehicle, the throttle valve opening of a carburetor in said vehicle, and the shift position of said automatic transmission to determine when a speed change is called for;
   (c) changing said direct coupled clutch from an engaging position to a disengaging position at the beginning of a speed change of said vehicle;
   (d) maintaining said direct coupled clutch in said disengaging condition during a first predetermined period of time established by a timer;
   (e) altering the condition of friction engaging elements in said transmission gear after the completion of a second predetermined period of time established by a timer but before the completion of said first predetermined period of time, a different timer being associated with each type of speed change; and
   (f) returning said direct coupled clutch to an engaging position after said speed change of said vehicle.

4. The method of speed change control in claim 3 further including the step of setting said first and second predetermined times corresponding to speed change stages before and after said speed change.

5. The method of speed change control in claim 4 further including the step of setting said first and second predetermined times according to the type of said automatic transmission.

6. The method of speed change control in claim 5 further including the step of monitoring shift range signals in said automatic transmission; and detecting speed by a change in said shift range signals of said automatic transmission.

7. The method of speed change control in claim 6 further including the steps of determining at the end of said first determined time whether said engine is run with a lock-up on; and
placing said direct coupled clutch in said engaged condition only when said engine is run with said lock-up on.

* * * * *